United States Patent
Satpathy et al.

(10) Patent No.: US 10,635,404 B2
(45) Date of Patent: Apr. 28, 2020

(54) MIXED-COORDINATE POINT MULTIPLICATION

(71) Applicant: Intel Corporation, Santa Clara, CA (US)

(72) Inventors: Sudhir K. Satpathy, Hillsboro, OR (US); Raghavan Kumar, Hillsboro, OR (US); Arvind Singh, Atlanta, GA (US); Vikram B. Suresh, Hillsboro, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 15/637,453

(22) Filed: Jun. 29, 2017

(65) Prior Publication Data

US 2019/0004770 A1    Jan. 3, 2019

(51) Int. Cl.
*G06F 7/72*   (2006.01)
*H04L 9/32*   (2006.01)
*G09C 1/00*   (2006.01)
*H04L 9/30*   (2006.01)

(52) U.S. Cl.
CPC ............... *G06F 7/725* (2013.01); *G09C 1/00* (2013.01); *H04L 9/3066* (2013.01); *H04L 9/3252* (2013.01)

(58) Field of Classification Search
CPC ............................... G06F 7/725; H04L 9/3252
See application file for complete search history.

(56) References Cited

U.S. PATENT DOCUMENTS

| | | | | |
|---|---|---|---|---|
| 2006/0280296 A1* | 12/2006 | Vasyltsov | ............... | G06F 7/725 380/28 |
| 2008/0219438 A1* | 9/2008 | Ebeid | ..................... | G06F 7/725 380/30 |
| 2010/0040225 A1* | 2/2010 | Venelli | ..................... | G06F 7/725 380/28 |
| 2010/0323698 A1* | 12/2010 | Rune | ..................... | H04W 48/06 455/436 |

* cited by examiner

*Primary Examiner* — Olugbenga O Idowu
(74) *Attorney, Agent, or Firm* — Alliance IP, LLC

(57) ABSTRACT

In one embodiment, an apparatus comprises a multiplier circuit to: identify a point multiply operation to be performed by the multiplier circuit, wherein the point multiply operation comprises point multiplication of a first plurality of operands; identify a point add operation associated with the point multiply operation, wherein the point add operation comprises point addition of a second plurality of operands, wherein the second plurality of operands comprises a first point and a second point, and wherein the first point and the second point are associated with a first coordinate system; convert the second point from the first coordinate system to a second coordinate system; perform the point add operation based on the first point associated with the first coordinate system and the second point associated with the second coordinate system; and perform the point multiply operation based on a result of the point add operation.

23 Claims, 10 Drawing Sheets

MIXED-COORDINATE POINT MULTIPLICATION

FIELD OF THE SPECIFICATION

This disclosure relates in general to the field of computer processing, and more particularly, though not exclusively, to point multiplication.

BACKGROUND

The increasing demand for robust computer security has led to widespread use of cryptography in mainstream computer systems and networks, along with the development of increasingly sophisticated and secure modern cryptography approaches. Cryptography often involves computationally demanding operations, particularly as the sophistication and security of modern cryptography continues to increase. For example, elliptic curve cryptography (ECC) is a form of public key or asymmetric cryptography, and is implemented using operations that involve point multiplication, which can be a computationally demanding operation.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
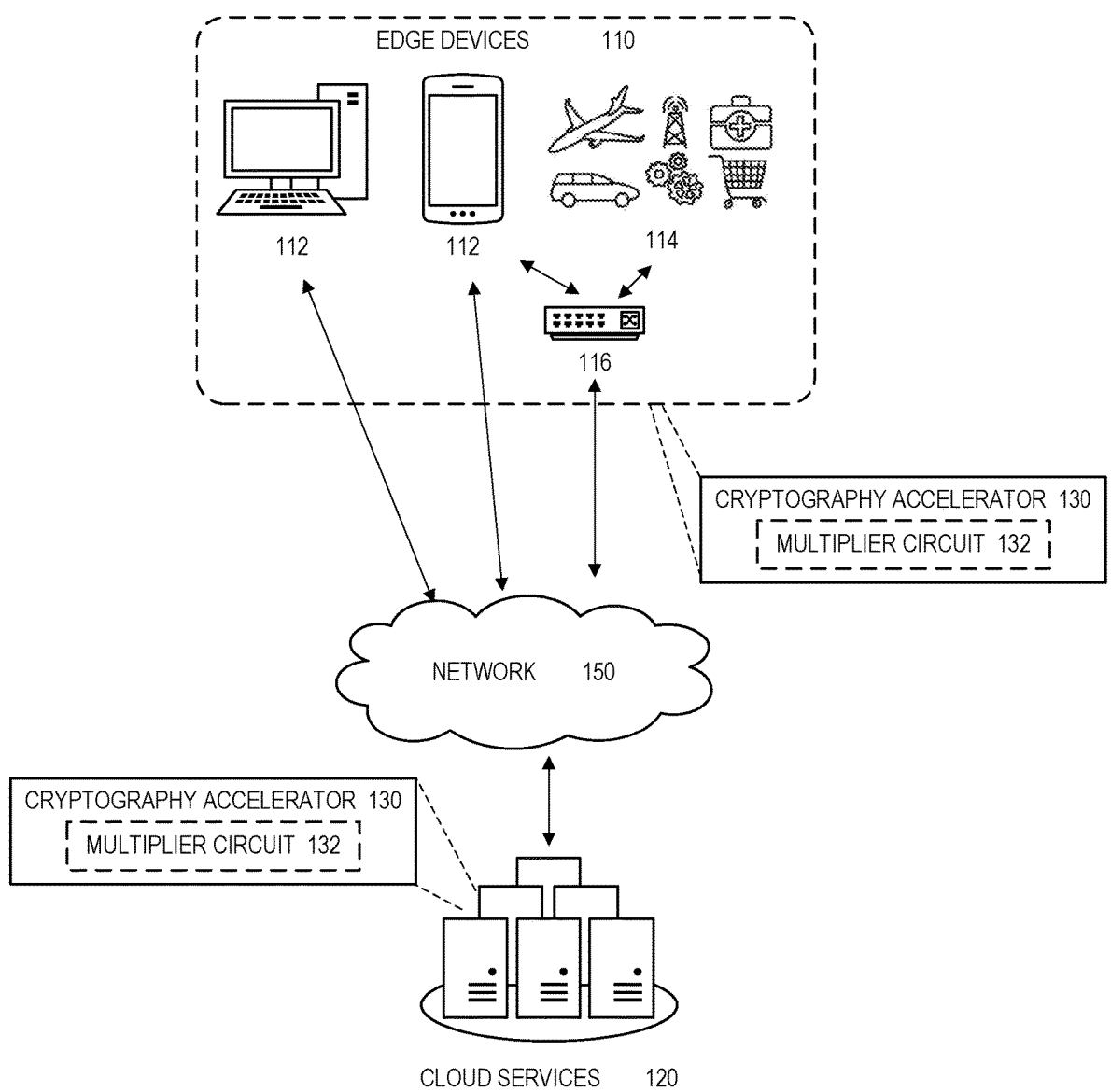
FIG. 1 illustrates a schematic diagram of an example computing system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The increasing demand for robust computer security has led to widespread use of cryptography in mainstream computer systems and networks, along with the development of increasingly sophisticated and secure modern cryptography approaches. Cryptography often involves computationally demanding operations, particularly as the sophistication and security of modern cryptography continues to increase.

For example, elliptic curve cryptography (ECC) is a form of public key or asymmetric cryptography, and is commonly used to generate digital signatures and verify the authenticity of digitally signed messages. A primary benefit of ECC is that it provides the same level of security as other forms of cryptography (e.g., RSA encryption) using significantly smaller key sizes, thus reducing the storage and transmission requirements for the keys. For example, a 384-bit ECC key can provide comparable security to a 7 k-bit RSA key. ECC, however, is implemented using operations that involve point multiplication, which can be a computationally demanding operation. For example, ECC is based on the algebraic structure of elliptic curves. An elliptic curve is a plane curve over a finite field with points satisfying the equation $y^2=x^3+ax+b$. The security of ECC is based on the intractability or difficulty of determining the logarithm of a random elliptic curve point with respect to a publicly known base point. As an example, point multiplication involves the repeated addition of a point along an elliptic curve (e.g., for an integer n and a point P on an elliptic curve, $nP=P+P+P+\ldots+P$). Moreover, the addition of two points on an elliptic curve (or the addition of a single point to itself) yields a third point on the elliptic curve whose location has no clear relationship to the original point(s). Thus, repetitively adding a point P to itself n times yields a point $Q=nP$ with an unpredictable location on the elliptic curve. ECC is based on the difficulty of determining n in the equation $Q=nP$, when points P and Q are known and the value of n is large. Accordingly, ECC depends on the ability to perform point multiplication efficiently, and the inability to compute a multiplicand given the original and resulting points.

Accordingly, performing point multiplication efficiently is critical to minimizing the latency of ECC operations. Point multiplication, however, can be a computationally demanding operation, particularly when performed in certain coordinate systems. For example, in some cases, point multiplication may be performed in the Affine coordinate system. Point multiplication in the Affine coordinate system, however, involves computationally-intense inversion operations that incur significant latency overhead. Alternatively, point multiplication can be performed in other coordinate systems that do not involve inversion operations, such as the Jacobian coordinate system, thus improving performance by eliminating the high latency associated with inversion operations. Performing point multiplication in the Jacobian coordinate system, however, requires storage and/or conversion of Jacobian coordinates, which may require additional logic and storage overhead and may also incur additional latency.

Accordingly, this disclosure describes various embodiments of mixed-coordinate point multiplication, which uses mixed representations of coordinates from multiple coordinate systems to accelerate point multiplication. For example, in some embodiments, point multiplication can be performed by leaving one operand in the native Affine coordinate system, while converting the other operand to the Jacobian coordinate system. The underlying calculations can then be performed using the mixed representation of operands. In this manner, high-latency inversion operations are eliminated, conversion and storage logic and latency is reduced since only one operand is converted to the Jacobian coordinate system, and the number of underlying multiplication and squaring calculations is also reduced (e.g., by ~30%). Accordingly, point multiplication can be performed up to 5.8 times faster using the embodiments described throughout this disclosure. The described embodiments are particularly advantageous for implementing elliptic curve cryptography (ECC) operations (e.g., key generation, signature generation and verification, encryption and decryption) or other types of functionality that involve point multiplication.

Example embodiments that may be used to implement the features and functionality of this disclosure will now be described with more particular reference to the attached FIGURES.

FIG. 1 illustrates a schematic diagram of an example computing system 100. In various embodiments, system 100 and/or its underlying components may include the mixed-coordinate point multiplication functionality described throughout this disclosure. In some embodiments, for example, mixed-coordinate point multiplication may be used to implement elliptic curve cryptography (ECC). For example, system 100 and/or its underlying components may include cryptography accelerators 130 that use mixed-coordinate point multiplication to accelerate ECC operations. A cryptography accelerator 130, for example, may be implemented using the embodiments of mixed-coordinate point multiplication described further throughout this disclosure and in connection with the remaining FIGURES. For example, in some embodiments, a cryptography accelerator 130 may be implemented using a multiplier circuit 132 that performs mixed-coordinate point multiplication. Moreover, a cryptography accelerator 130 may be implemented by any component of system 100, such as edge devices 110, cloud services 120, and/or communications network 150. The various components of computing system 100 will now be discussed further below.

Edge devices 110 may include any equipment and/or devices deployed or connected near the "edge" of a communication system 100. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 may communicate with each other and/or with other remote networks and services (e.g., cloud services 120) through one or more networks and/or communication protocols, such as communication network 150. Moreover, in some embodiments, an edge device 110 may include one or more cryptography accelerators 130 for accelerating cryptography operations using the mixed-coordinate point multiplication functionality described throughout this disclosure.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, a cloud service 120 may include one or more cryptography accelerators 130 for accelerating cryptography operations using the mixed-coordinate point multiplication functionality described throughout this disclosure.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Cryptography accelerators 130 may be used to accelerate cryptography operations, such as elliptic curve cryptography (ECC) operations. In some embodiments, for example, a cryptography accelerator 130 may include a multiplier circuit 132 to accelerate the point multiplication operations associated with elliptic curve cryptography (ECC). A multiplier circuit 132, for example, may be implemented using the embodiments of mixed-coordinate point multiplication described throughout this disclosure. Moreover, cryptography accelerator 130 and/or multiplier circuit 132 may be implemented using any type or combination of hardware and/or software logic, including semiconductor chips, accelerators, transistors, integrated circuits, application specific integrated circuits (ASIC), field programmable gate arrays (FPGA), processors (e.g., microprocessors), and/or any software logic, firmware, instructions, or code.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Elliptic Curve Cryptography

Figure 2:
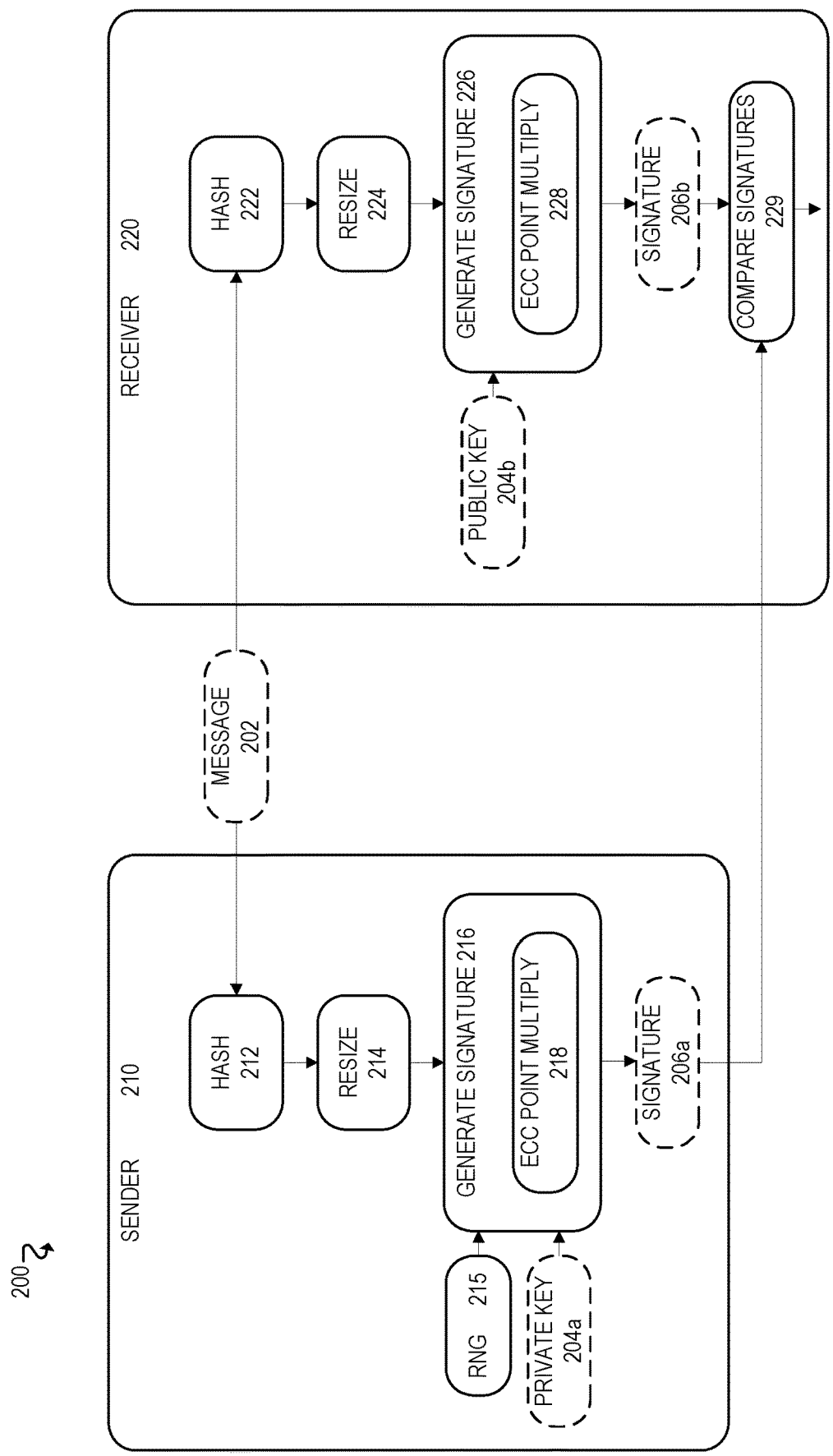
FIG. 2 illustrates an example of digital signature verification using elliptic curve cryptography.

FIG. 2 illustrates an example 200 of digital signature verification using elliptic curve cryptography (ECC). In some embodiments, the illustrated example of digital signature verification may be performed using a multiplier circuit with mixed-coordinate point multiplication functionality (e.g., point multiplier circuit 300 of FIG. 3), as described in connection with other FIGURES.

In the illustrated example, the elliptic-curve digital signature authentication (ECDSA) algorithm is used to generate and verify the signature for a digitally signed message using elliptic curve cryptography (ECC). For example, sender 210 uses a private key 204a to digitally sign a message 202 using ECC, and receiver 220 uses a public key 204b to verify the digital signature of the message 202 using ECC (e.g., to confirm the identity of sender 210).

In order to generate the digital signature, sender 210 first computes a hash of the original message 202 (block 212). The hash value is then resized (block 214) so that it contains the same number of bits as the ECC keys 204a,b. Sender 210 then generates a signature 206a (block 216) for message 202 using the hash value, a randomly generated number (e.g., generated by random number generator 215), and the private key 204a. The signature 206a is generated using an ECC point multiplication operation (block 218), among other operations.

The signature 206a generated by sender 210 is then verified by receiver 220 using the public key 204b of sender 210, along with some additional helper information. For example, receiver 220 uses public key 204b to generate its own signature 206b for message 202 (block 226), and then compares the respective signatures 206a,b to determine if they match (block 229). As with the signature 206a generated by sender 210, the signature 206b generated by receiver 220 involves computing a hash of the original message 202 (block 222), resizing the hash value based on the key size (block 224), and performing an ECC point multiplication operation (block 228), among other operations.

TABLE 1 identifies the latency for the various operations involved in signature generation and verification using the ECDSA algorithm. As shown by TABLE 1, the ECC point multiplication operations performed by sender 210 and receiver 220 are the most performance critical operations of the ECC signature generation and verification process, typically contributing up to 99% of the total computations.

TABLE 1

Latency For Elliptic Curve Digital Signature Authentication

| OPERATION | LATENCY (CYCLES) |
|---|---|
| Hash | 80 |
| Pad | 1 |
| Random number generation | 384 |
| Inversion | 768 |
| Multiplication | 72 |
| ECC Point Multiplication | 5,500,000 |

Thus, it is crucial to perform point multiplication efficiently for ECC operations. Accordingly, in some embodiments, point multiplication for ECC operations may be performed using mixed-coordinate point multiplication, as described further throughout this disclosure.

Mixed-Coordinate Point Multiplication

Figure 3:
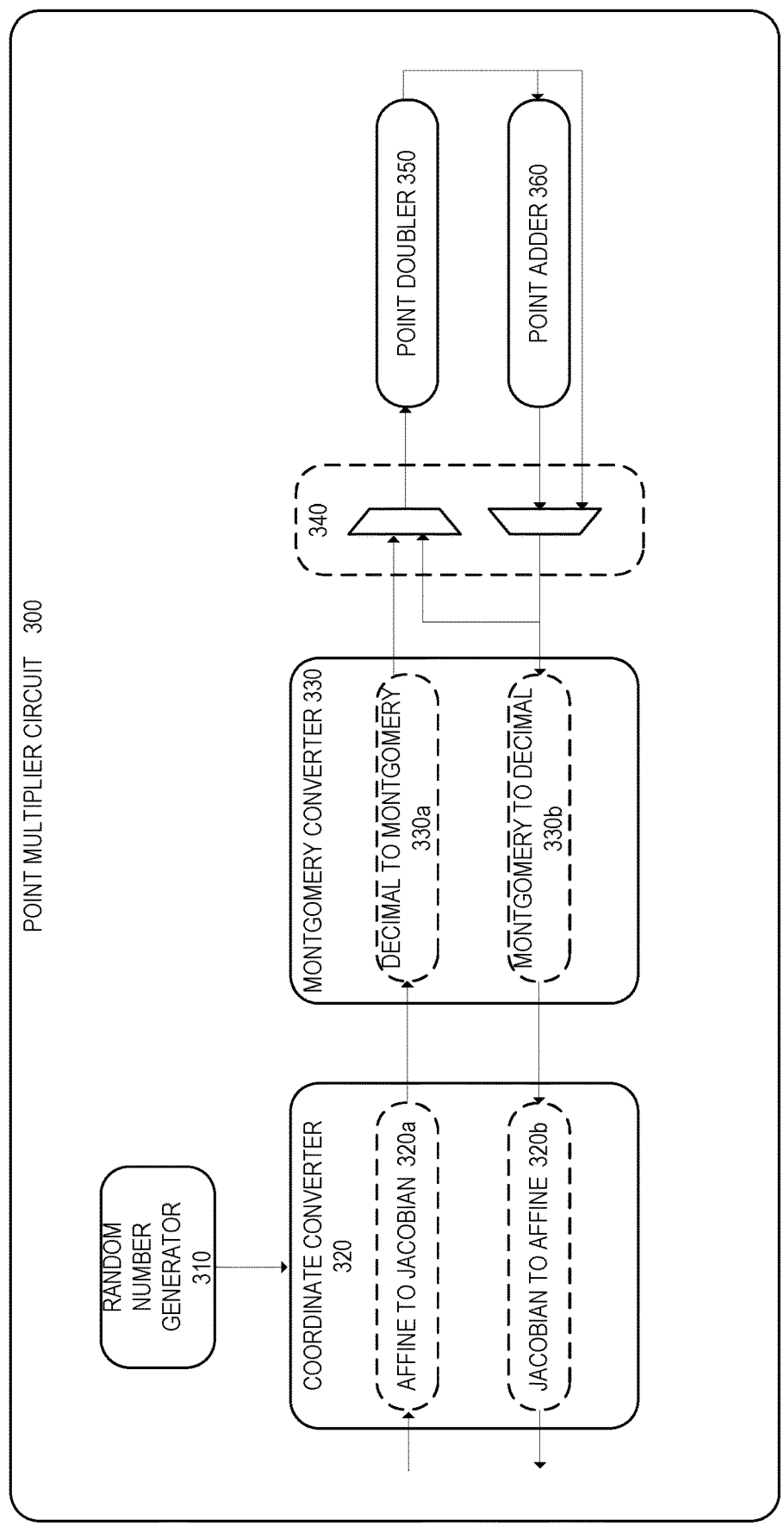
FIG. 3 illustrates an example embodiment of a point multiplier circuit for performing mixed-coordinate point multiplication.

FIG. 3 illustrates an example embodiment of a point multiplier circuit 300 for performing mixed-coordinate point multiplication. In some embodiments, for example, a cryptography accelerator for accelerating cryptography operations may use point multiplier circuit 300 to accelerate the point multiplication operations associated with elliptic curve cryptography (ECC). For example, point multiplier circuit 300 could be used to accelerate ECC key generation and signature verification (e.g., using the elliptic curve Diffie-Hellman (ECDH) key agreement protocol and/or the elliptic-curve digital signature authentication (ECDSA) algorithm). In various embodiments, point multiplier circuit 300 and its associated components and functionality may be implemented using any type or combination of hardware and/or software logic, including semiconductor chips, accelerators, transistors, integrated circuits, application specific integrated circuits (ASICs), field programmable gate arrays (FPGAs), processors (e.g., microprocessors), and/or any software logic, firmware, instructions, or code.

Elliptic curve cryptography (ECC) is a form of cryptography implemented using point multiplication on an elliptic curve. Point multiplication, however, can be a computationally demanding operation, and thus it is desirable to perform point multiplication as efficiently as possible (e.g., to reduce the latency of ECC operations). For example, point multiplication can be performed in a variety of coordinate systems, such as the Affine coordinate system or the Jacobian coordinate system. Point multiplication in the Affine coordinate system, however, involves computationally-intense inversion operations that incur significant latency overhead. Alternatively, point multiplication can be performed in other coordinate systems that do not involve inversion operations, such as the Jacobian coordinate system, thus improving performance by eliminating the high latency associated with the inversion operations. The Jacobian coordinate system, however, requires significantly more storage overhead due to the larger size of the operands and coordinates.

Accordingly, in some embodiments, coordinates may be primarily represented using the Affine coordinate system, but may be temporarily converted to the Jacobian coordinate system to perform point multiplication. For example, when point multiplication needs to be performed, the operands may initially be in the Affine coordinate system and thus may be converted to the Jacobian coordinate system for the point multiplication (e.g., thus eliminating the inversion operations), and the result of the point multiplication may then be converted back to the Affine coordinate system from the Jacobian coordinate system. In this manner, the performance benefits of point multiplication in the Jacobian coordinate system are achieved (e.g., reduced latency from elimination of the inversion operations), while the additional storage overhead for Jacobian coordinates is limited since those coordinates are only stored during the point multiplication. This approach requires additional conversion logic, however, and also incurs additional latency due to the overhead from converting the operands. Moreover, additional storage overhead is still required to store the Jacobian coordinates during the point multiplication, and also to store information required for the conversions (e.g., a conversion factor that evolves with each coordinate transformation). Accordingly, point multiplication in the Affine coordinate system incurs significant latency due to the inversion operations, while point multiplication in the Jacobian coordinate system improves performance (e.g., by eliminating the inversion operations) but increases the storage requirements and/or requires additional conversion logic and latency.

In the illustrated embodiment, point multiplier circuit 300 is implemented using "mixed-coordinate" point multiplication, which uses mixed representations of coordinates from multiple coordinate systems to accelerate point multiplication operations. In some embodiments, for example, point multiplier circuit 300 is implemented with a mixed-coordinate datapath, allowing it to opportunistically transform one operand to the Jacobian coordinate system, while leaving the other operand in the native Affine coordinate system. Point multiplier circuit 300 then performs the underlying calculations using the mixed representation of operands. In this manner, opportunistically converting only one operand to the Jacobian coordinate system (rather than both operands) reduces the conversion logic and storage overhead for the converted Jacobian coordinates, while also eliminating the high-latency inversion operations and reducing the number of underlying calculations. For example, mixed-coordinate point multiplication (e.g., point multiplication using a mixed representation of operands in the Affine and Jacobian coordinate systems) involves a different set of equations than point multiplication using operands in the same coordinate system (e.g., point multiplication using purely Affine operands or purely Jacobian operands). Moreover, the equations used for mixed-coordinate point multiplication do not include any inversion operations, thus eliminating the high latency associated with the inversion operations required in Affine point multiplication. The equations used for mixed-coordinate point multiplication also contain fewer underlying multiplication and squaring calculations than the equations used for Jacobian point multiplication. Mixed-coordinate point multiplication also reduces the requisite conversion logic and storage overhead since only one of the operands is converted to the Jacobian coordinate system rather than both operands.

In some cases, for example, point multiplication may be implemented using a series of point doubling and point addition operations. For example, the point multiplication Q=kP involves multiplication of a point P by a scalar operand k in order to obtain a resulting point Q. This point multiplication (Q=kP) can be computed using a series of point doubling and point addition operations. For example, point multiplication of a point P by an n-bit operand k ($k=k_{n-1}, k_{n-2}, \ldots, k_0$) can be performed by iterating through each bit of operand k (e.g., from most significant bit to least significant bit (left-to-right) or vice versa), performing a point doubling operation and conditionally a point addition operation, and accumulating the partial results during each iteration. For example, when processing a particular bit $k_x$ of operand k, the current partial result is doubled using a point doubling operation ($Q_{partial}=2*Q_{partial}$), and if bit $k_x$ has a value of 1, the original point operand P is also added to the current partial result using a point addition operation ($Q_{partial}=Q_{partial}+P$).

These point doubling and point addition operations can be implemented in a single coordinate system, such as the Affine coordinate system or the Jacobian coordinate system, or in some cases, a mixed-coordinate system (e.g., a combination of the Affine and Jacobian coordinate systems). For example, given that point doubling involves a single point operand, point doubling can be implemented using a single coordinate system, such as either the Affine coordinate system or the Jacobian coordinate system. In addition, in some embodiments, point doubling may be implemented by converting the single point operand from the native Affine coordinate system to the Jacobian coordinate system in order to avoid the high-latency inversion operations associated with the Affine coordinate system. Point addition, on the other hand, involves two points operands. Accordingly, point addition can be implemented using the same coordinate system for both operands (e.g., either the Affine or Jacobian coordinate systems), or using a mixed-coordinate system that uses a different coordinate system for each operand (e.g., the Affine coordinate system for one operand and the Jacobian coordinate system for the other operand). For example, in some embodiments, the datapath of point multiplier circuit 300 can be optimized to perform point addition by opportunistically converting one operand into the Jacobian coordinate system, while leaving the other operand in the native Affine coordinate system. For example, as discussed above, the point addition operations used for point multiplication each involve adding the current partial point with the original point operand of the point multiplication. Thus, the original point operand of the point multiplication is used across all underlying point addition operations, while the current partial point varies across those point addition operations. Accordingly, in some embodiments, the original point operand shared across all point addition operations can be converted to the Jacobian coordinate system, while the current partial point that varies across the point addition operations can be left in the Affine coordinate system. In this manner, the Jacobian conversion only has to be performed once at the beginning of the point multiplication rather than for each point addition operation, and only for one of the point addition operands. Moreover, performing point addition using this mixture of Affine and Jacobian operands avoids the high-latency inversion operations associated with point addition using only Affine operands.

Accordingly, for mixed-coordinate point multiplication, point multiplier circuit 300 may include a coordinate converter 320 to perform conversions 320a,b from the Affine to Jacobian coordinate systems and vice versa. Similarly, point multiplier circuit 300 may include a point doubler 350 and a point adder 360 to perform point doubling and point addition on the converted coordinates, and may also include accumulators 340 to accumulate the results of the point doubling and addition.

The set of equations for these point doubling and point addition operations varies depending on the particular coordinate system(s) used for their implementation. For example, TABLE 2 identifies equations used for example embodiments of Affine point multiplication, Jacobian point multiplication, and mixed-coordinate point multiplication.

TABLE 2

Point Multiplication Equations For Various Coordinate Systems

| | AFFINE | JACOBIAN | MIXED |
|---|---|---|---|
| Curve Equation | $y^2 = x^3 + ax + b$ | $Y^2 = X^3 + aZ^4X + bZ^6$ | N/A |
| Point Double | $Q = 2G$ <br> $x_3 = \left(\frac{3x_1^2 + a}{2y_1}\right)^2 - 2x_1$ <br> $y_3 = \left(\frac{3x_1^2 + a}{2y_1}\right)(x_1 - x_3) - y_1$ | $Q = 2P$ <br> $X_3 = (3X_1^2 + aZ_1^4)^2 - 8X_1Y_1^2$ <br> $Y_3 = (3X_1^2 + aZ_1^4)(8X_1Y_1^2 - X_3) - 8Y_1^4$ <br> $Z_3 = 2Y_1Z_1$ | Same equations identified for point doubling in the Jacobian coordinate system. |
| Point Add | $Q = G_1(x_1,y_1) + G_2(x_2,y_2)$ <br> $x^3 = \left(\frac{y_2 - y_1}{x_2 - x_1}\right)^2 - x_1 - x_2$ <br> $y_3 = \left(\frac{y_2 - y_1}{x_2 - x_1}\right)(x_1 - x_3) - y_1$ | $Q = P_1(X_1,Y_1,Z_1) + P_2(X_2,Y_2,Z_2)$ <br> $X_3 = (Y_2Z_1^3 - Y_1Z_2^3)^2 - (X_2Z_1^2 - X_1Z_2^2)^2(X_2Z_1^2 + X_1Z_2^2)$ <br> $Y_3 = (Y_2Z_1^3 - Y_1Z_2^3)(X_1Z_2^2(X_2Z_1^2 - X_1Z_2^2)^2 - X_3) - Y_1Z_2^3(X_2Z_1^2 - X_1Z_2^2)^3$ <br> $Z_3 = Z_1Z_2(X_2Z_1^2 - X_1Z_2^2)$ | $Q = P_1(X_1,Y_1,Z_1) + P_2(x_2,y_2)$ <br> $X_3 = (Y_2Z_1^3 - Y_1)^2 - (X_2Z_1^2 - X_1)^2(X_2Z_1^2 + X_1)$ <br> $Y_3 = (Y_2Z_1^3 - Y_1)(X_1(X_2Z_1^2 - X_1)^2 - X_3) - Y_1(X_2Z_1^2 - X_1)^3$ <br> $Z_3 = Z_1(X_2Z_1^2 - X_1)$ |

As shown by TABLE 2, Affine point multiplication includes various division operations in the point doubling and point addition equations. Moreover, because division is implemented by multiplying the numerator against the multiplicative inverse of the denominator ($a/b=a*b^{-1}$), a division operation requires an inversion to be performed. Accordingly, Affine point multiplication requires high-latency inversions to be performed for the division operations in the point doubling and point addition equations. Modular inversion, for example, is calculated bit-serially (e.g., one bit per cycle) using a series of multiplication-compare-shift operations, rendering it 6-10 times slower than multiplication and squaring calculations, and thus accounting for 85% of the total latency for point doubling and point addition in the Affine coordinate system.

Moreover, as shown by TABLE 2, Jacobian point multiplication does not include any division operations in the point doubling and point addition equations. For example, the equations for Jacobian point multiplication include various multiplication and squaring computations rather than division. Accordingly, Jacobian point multiplication avoids the high-latency inversion operations that are required for Affine point multiplication. In some cases, this may result in latency reductions by a factor of 2.5 for point doubling and a factor of 1.6 for point addition. This not only improves the performance of point multiplication (and ECC operations), but also provides an opportunity for additional acceleration, for example, by optimizing the datapath of point multiplier circuit 300 to perform faster multiplication and squaring due to the quadratic latency trade-off for multiplication and squaring compared to the linear trade-off for inversions.

Similarly, as shown by TABLE 2, mixed-coordinate point multiplication does not include any division operations in the point doubling and point addition equations, and thus also avoids the high-latency inversion operations that are required for Affine point multiplication. For example, in some embodiments of mixed-coordinate point multiplication, point doubling may be performed using the same equations as Jacobian point multiplication, while point addition may be performed using equations that involve both Affine and Jacobian coordinates. For example, because point doubling only involves one point operand, it can be performed in either the Affine coordinate system, the Jacobian coordinate system, or another coordinate system. Accordingly, in some embodiments, mixed-coordinate point multiplication may perform point doubling in the Jacobian coordinate system to avoid the high-latency inversion operations that are required in the Affine coordinate system. Point addition, however, involves two point operands. Accordingly, in some embodiments, mixed-coordinate point multiplication may perform point addition by leaving one operand in the native Affine coordinate system and converting the other operand to the Jacobian coordinate system. In this manner, a conversion only needs to be performed on one of the operands, while the high-latency inversion operations are still eliminated.

Moreover, as shown by TABLE 2, the equations used for mixed-coordinate point multiplication contain fewer underlying multiplication and squaring calculations than the equations used for Jacobian point multiplication. Accordingly, mixed-coordinate point multiplication further reduces the number of underlying multiplication and squaring operations by approximately 30% compared to Jacobian point multiplication.

To illustrate, TABLE 3 identifies the number of inversion (I), multiplication (M), and squaring (S) operations required for the embodiments of point multiplication from TABLE 2 (e.g., Affine point multiplication, Jacobian point multiplication, and mixed-coordinate point multiplication).

TABLE 3

Number of Operations for Point Multiplication Embodiments

| | AFFINE | JACOBIAN | MIXED |
|---|---|---|---|
| Point Double | 1I + 2M + 2S | 4M + 4S | Same as Jacobian |
| Point Add | 1I + 2M + 1S | 12M + 4S | 8M + 3S |

Moreover, for elliptic curve cryptography (ECC), point multiplication is performed using modular arithmetic. Accordingly, the underlying arithmetic operations in the point double and point add equations (e.g., the multiplication and squaring operations) are implemented using modular arithmetic. For example, modular arithmetic on an integer a and modulus N (a mod N) is the remainder of a divided by N. Moreover, modular multiplication of two integers a and b with modulus N (ab mod N) is traditionally performed by first multiplying a and b, and then determining the remainder of the multiplication result divided by N. For example, for an ECC key size of 384-bits, the underlying multiplication operations for ECC may involve multiplication of two 384-bit operands, yielding a 768-bit result. Performing modular arithmetic on the result, however, may then reduce the 768-bit result back to 384-bits (e.g., by determining the remainder when the 768-bit result is divided by a 384-bit modulus). In this manner, the modular arithmetic is typically performed on the multiplication result after the multiplication is complete. However, this traditional approach to modular multiplication requires the 768-bit multiplication result (which is double the size of the operands) to be processed serially, one bit at a time. In addition, that approach also requires the 768-bit intermediate multiplication result to be stored, which requires additional storage that is twice the size of the 384-bit operands and the 384-bit final result of the modular arithmetic.

Accordingly, in some embodiments, modular multiplication used for ECC operations may be implemented using Montgomery multiplication rather than regular modular multiplication. Montgomery multiplication is a faster approach for performing modular multiplication. For example, for modular multiplication of two integers a and b with modulus N (ab mod N), Montgomery multiplication works by transforming a and b into a representation known as Montgomery form, and then performing Montgomery multiplication on the Montgomery operands. The intermediate result is then transformed out of Montgomery form to yield the result of the modular multiplication operation ab mod N. In this manner, the modular arithmetic is performed in-line (e.g., during the multiplication rather than afterwards), thus significantly reducing latency, and reducing storage requirements for the intermediate multiplication result (e.g., thus resulting in an 83% reduction in storage overhead and similarly a 45% savings in accumulator area). For example, for a point multiplier circuit 300 that performs Montgomery multiplication on 384-bit operands using a 64-bit multiplier, the modular arithmetic can be performed on 64-bits per cycle during the multiplication operation (resulting in a total latency of 96 cycles for multiplication of 384-bit operands). By comparison, traditional modular multiplication is performed after the multiplication operation, one bit per cycle, on a multiplication result twice the size of the operands (e.g., 768-bits versus 384-bits). Accordingly, in some embodiments, point multiplier circuit 300 may include a Montgomery converter 330 to perform conversions 330a,b from decimal to Montgomery and vice versa.

Accordingly, using mixed-coordinate point multiplication, point multiplier circuit 300 eliminates high-latency inversion operations, reduces the number of underlying multiplication and squaring calculations (e.g., by ~30%), reduces conversion logic, and reduces storage overhead. In addition, when implemented using high-radix Montgomery multiplication, point multiplier circuit 300 reduces latency and storage overhead even further. In this manner, using mixed-coordinate point multiplication and high-radix Montgomery multiplication, point multiplier circuit 300 improves the performance of point multiplication up to 5.8 times over that of existing approaches. In addition, point multiplier circuit 300 reduces power consumption and also reduces the requisite circuitry area for the point multiplication logic, rendering it particularly suitable for resource constrained platforms (e.g., devices with power and/or size constraints, such as mobile devices).

In some cases, however, elliptic curve cryptography (ECC) may be vulnerable to side-channel attacks based on the distinct physical profiles associated with point multiplication. For example, each point multiplication operation may have a distinct physical profile based on its latency, power consumption, memory access patterns, control flow, and so forth. Thus, in some cases, an attacker could attempt a side-channel attack to derive an ECC key based on the physical profile of an associated point multiplication operation.

Accordingly, in some embodiments, ECC may be implemented using "randomized" point multiplication to randomize the physical profiles of point multiplication operations. In some embodiments, for example, point multiplication may be implemented by randomly selecting a coordinate system for the underlying point doubling and point addition operations. For example, in some embodiments, each underlying point doubling and point addition operation may be randomly performed in either the Affine coordinate system, the Jacobian coordinate system, or a mixed Affine-Jacobian coordinate system. In this manner, point multiplication is performed using a randomized physical profile (e.g., randomized latency, power consumption, memory access patterns, control flow, timing, intermediate data, and so forth), thus thwarting the effectiveness of any attempted side-channel attacks.

In some embodiments, for example, point multiplier circuit 300 may include a random number generator 310 to generate random numbers for randomizing the underlying point doubling and point addition operations. For example, in some embodiments, a random number may be generated with the same number of bits as the point multiplication operand (e.g., 384 bits). In this manner, when iterating through each bit of the operand to perform the underlying point doubling and addition operations, the corresponding bit in the random number may indicate whether to perform those underlying operations in the Affine coordinate system, the Jacobian coordinate system, or a mixed Affine-Jacobian coordinate system. For example, in some embodiments, if the corresponding bit of the random number has a value of 0, then the current iteration of point doubling and/or point addition may be performed in the Affine coordinate system. However, if the corresponding bit of the random number has a value of 1, then the point doubling may be performed in the Jacobian coordinate system, and the point addition (if required) may be performed in either the Jacobian coordinate system or a mixed Affine-Jacobian coordinate system. In this manner, if the coordinate system selected for the current iteration differs from that of the previous iteration, then a conversion may be required (e.g., from Affine to Jacobian or vice versa).

Alternatively, in some embodiments, the randomization may be implemented using bit boundaries rather than bit-by-bit. For example, in some embodiments, randomization for a 384-bit point multiplication operand may be implemented using a bit boundary of 32 bits, and thus a randomly generated number with 12 bits (e.g., 384-bit operand/32-bit boundary=12-bit random number). Accordingly, the first bit of the random number may identify the coordinate system to use for the first 32 bits of the operand, the second bit of the random number may identify the coordinate system to use for the next 32 bits of the operand, and so forth. In this manner, while the degree of randomization may be reduced compared to the bit-by-bit randomization, performance may improve given that fewer conversions are required.

Thus, while pure mixed-coordinate point multiplication may provide higher performance, randomized point multiplication may provide a desired balance of both performance and security (e.g., by providing resiliency to side-channel attacks while also leveraging the performance benefits of mixed-coordinate point multiplication for some of the underlying operations). Other approaches for providing resiliency to side-channel attacks may involve dual-rail logic and dummy microcode insertion, which may result in significant area, power, and latency overhead. The described embodiments of randomized point multiplication, however, provide a low-cost solution that may only require minor hardware modifications.

Figure 4:
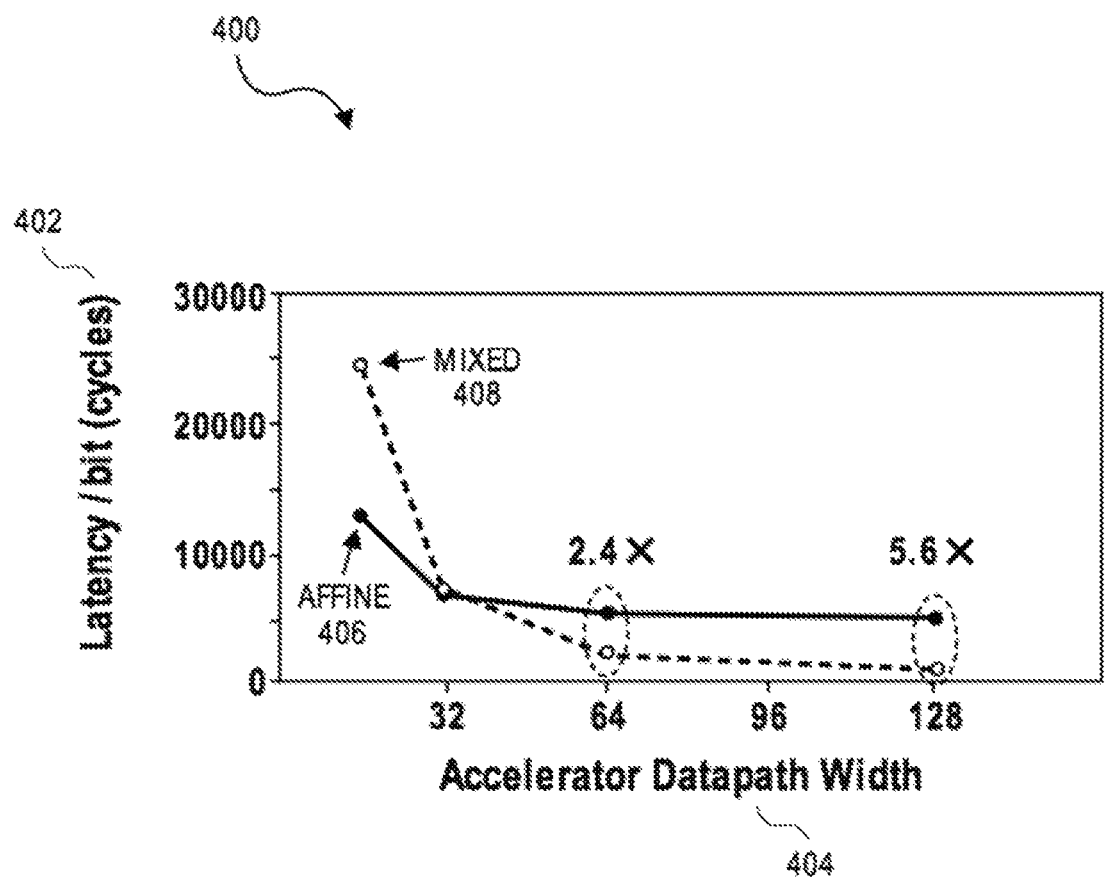
FIG. 4 illustrates the performance of various embodiments of point multiplication.

FIG. 4 illustrates a graph 400 of the performance of various embodiments of point multiplication. In particular, graph 400 illustrates the performance of Affine point multiplication 406 and mixed-coordinate point multiplication 408. For example, graph 400 illustrates the latency 402 of those point multiplication embodiments when implemented using varying datapath widths 404.

As shown by graph 400, mixed-coordinate point multiplication 408 has lower latency 402 (and thus better performance) than Affine point multiplication 406 for higher radix datapaths (e.g., datapath widths 404 larger than 32-bits). For example, compared to Affine point multiplication 406, the latency of mixed-coordinate point multiplication 408 is 2.4 times lower for 64-bit datapaths, and 5.6 times lower for 128-bit datapaths. In this manner, the performance of point multiplication can be improved by a factor of up to 5.6, for example, when performed using 384-bit operands and a 128-bit datapath, 128-bit multiplier, and 256-bit accumulator (e.g., thus performing multiplication on 128 bits×128 bits per cycle).

However, the performance of Affine point multiplication 406 may be better than mixed-coordinate point multiplication 408 in certain circumstances, such as for smaller datapaths (e.g., 32-bit datapaths or narrower). Accordingly, for implementations that are programmable and/or adjustable (e.g., FPGA-based implementations), the coordinate system used for point multiplication can be dynamically selected to maximize performance based on the available resources and circumstances. For example, in FPGA implementations, mixed-coordinate point multiplication may be used when the datapath has over 32-bits of bandwidth availability, while Affine point multiplication may be used when the datapath only has bandwidth availability of 32-bits or less (e.g., when other applications are competing for FPGA resources).

Figure 5:
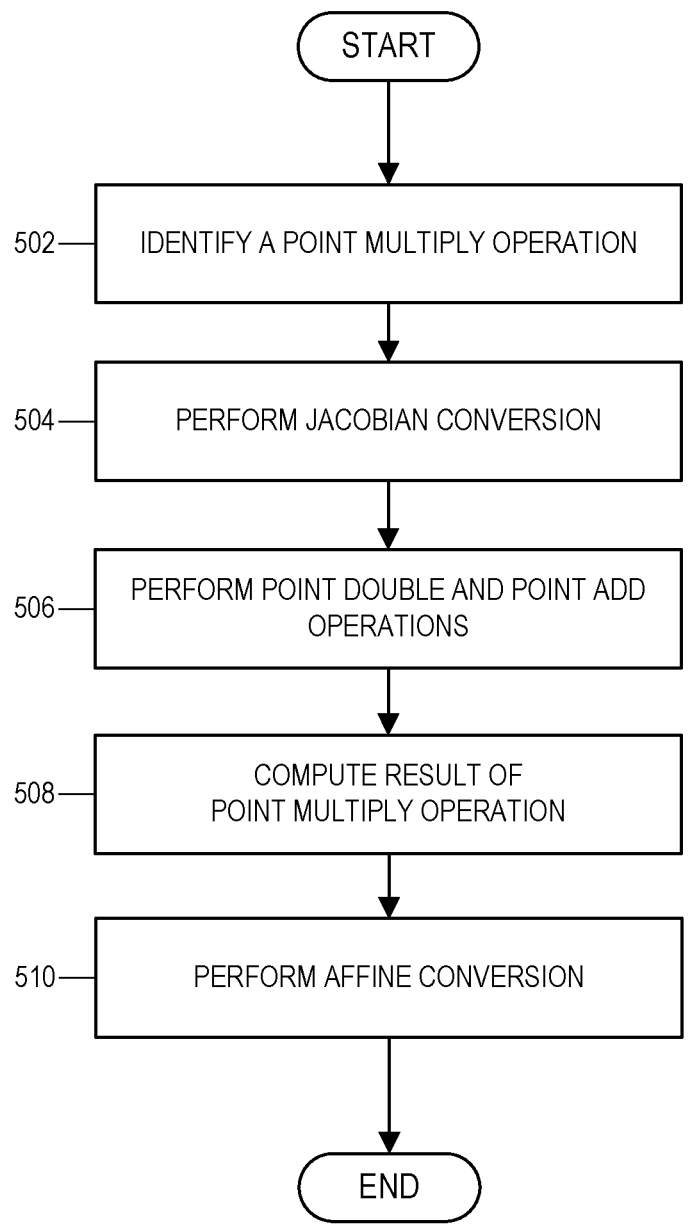
FIG. 5 illustrates a flowchart for an example embodiment of mixed-coordinate point multiplication.

FIG. 5 illustrates a flowchart 500 for an example embodiment of mixed-coordinate point multiplication. Flowchart 500 may be implemented, for example, using the embodiments and functionality described throughout this disclosure. For example, in some embodiments, flowchart 500 may be implemented using point multiplier circuit 300 of FIG. 3.

The flowchart may begin at block 502 by identifying a point multiply operation. For example, in some embodiments, the point multiply operation may involve point multiplication based on a point on an elliptic curve. For example, in some cases, the elliptic curve point may be multiplied by a particular scalar or integer. Moreover, in some embodiments, the point multiply operation may be associated with elliptic curve cryptography (ECC). For example, ECC is a form of cryptography implemented using point multiplication on points of an elliptic curve. Accordingly, in some embodiments, the point multiply operation may be performed by a multiplier circuit and/or cryptography accelerator used for accelerating ECC operations.

Point multiplication, however, can be a computationally demanding operation, particularly when performed in certain coordinate systems. For example, point multiplication can be performed in various coordinate systems, such as the Affine or Jacobian coordinate systems. Point multiplication in the Affine coordinate system, however, involves computationally-intense inversion operations that incur significant latency overhead. Point multiplication in the Jacobian system eliminates these high-latency inversion operations, but may involve additional logic, storage overhead, and/or latency from converting and/or storing the Jacobian coordinates.

Accordingly, in some embodiments, point multiplication may be performed using mixed-coordinate point multiplication, which uses mixed representations of coordinates from multiple coordinate systems to accelerate point multiplication. For example, in some embodiments, points may be primarily represented using the Affine coordinate system, but certain point operands may be opportunistically converted to the Jacobian coordinate system to improve performance (e.g., by eliminating inversion operations and minimizing any additional overhead associated with the Jacobian coordinate system). Accordingly, in some embodiments, the original point operand associated with the point multiply operation may initially be in the Affine coordinate system.

The flowchart may then proceed to block 504 to perform a Jacobian conversion.

In some embodiments, for example, a point multiply operation may be implemented using a series of point double and point add operations. For example, point multiplication of a particular point by a scalar or integer operand can be implemented by iterating through each bit of the operand, and during each iteration, performing a point double operation and conditionally a point add operation, accumulating the partial points across the respective iterations. For example, in some embodiments, when processing a particular bit of the scalar operand, the current partial point is doubled using a point double operation, and if the current bit of the scalar operand has a value of 1, the original point operand is also added to the current partial point using a point addition operation.

In some embodiments, the point double and point add operations used for point multiplication may be implemented using a mixed-coordinate system. For example, a point double operation (which involves a single point operand) may be performed in the Jacobian coordinate system in order to eliminate the high-latency inversion operations required in the Affine coordinate system. However, a point add operation (which involves two points operands) may be performed using a different coordinate system to represent each operand. For example, in some embodiments, a point add operation may be implemented by leaving one operand in the native Affine coordinate system and converting the other operand to the Jacobian coordinate system. Using this approach, the point add operation does not require any high-latency inversion operations, and a conversion only needs to be performed on one of the operands.

Moreover, in some embodiments, mixed-coordinate point multiplication can be implemented using one Jacobian conversion at the beginning of the point multiply operation, and one Affine conversion at the end of the point multiply operation. For example, the original point operand of the point multiply operation may initially be represented in the Affine coordinate system. Moreover, that operand may be transformed to the Jacobian coordinate system before performing the point double and point add operations. In this manner, the point double operations will be performed on a Jacobian operand, while the point add operations will be performed on a Jacobian operand and an Affine operand. For example, in some embodiments, the point add operations may use one operand that is shared across all point add operations, but may use another operand that differs for each point add operation. In some embodiments, for example, the original operand of the point multiply operation may be shared across all point add operations. Accordingly, the operand that is shared across all point add operations can be converted to the Jacobian coordinate system at the beginning of the point multiply operation, while the operand that differs across the point add operations can be left in the Affine coordinate system. In this manner, the Jacobian conversion only has to be performed once at the beginning of the point multiply operation rather than for each point add operation, and only for one of the point add operands. Accordingly, the Jacobian conversion may be performed at block 504.

Alternatively, in some embodiments, a point multiply operation may be implemented by randomly selecting a coordinate system for each point double and point add operation. In this manner, the point multiply operation is performed using a randomized physical profile (e.g., randomized latency, power consumption, memory access patterns, and so forth), thus thwarting any side-channel attacks that attempt to derive the ECC cryptography key based on the physical profile of the point multiply operation. For example, in some embodiments, a random number may be generated using a random number generator, and the random number may be used to determine whether to perform each iteration of point double and point add operations using the Affine coordinate system, the Jacobian coordinate system, or both.

The flowchart may then proceed to block 506 to perform the point double and point add operations associated with the point multiply operation. For example, for mixed-coordinate point multiplication, the point double operations may be performed in the Jacobian coordinate system, and the point add operations may be performed in a mixed Affine-Jacobian coordinate system (e.g., using one Affine operand and one Jacobian operand). Alternatively, for randomized point multiplication (e.g., point multiplication using a randomized physical profile), each point double and point add operation may be implemented in either the Affine coordinate system, the Jacobian coordinate system, or a mixed Affine-Jacobian coordinate system.

The flowchart may then proceed to block 508 to compute a result of the point multiply operation. The result of the point multiply operation, for example, may be based on the partial points accumulated across the point double and point add operations.

The flowchart may then proceed to block 510 to perform an Affine conversion on the result of the multiply operation. For example, in some embodiments, the result of the multiply operation may initially be in the Jacobian coordinate system due to the prior Affine to Jacobian conversion(s). Accordingly, the result of the point multiply operation may need to be converted back to the native Affine coordinate system from the Jacobian coordinate system.

At this point, the flowchart may be complete. In some embodiments, however, the flowchart may restart and/or certain blocks may be repeated. For example, in some embodiments, the flowchart may restart at block 502 to continue performing point multiply operations.

Example Computing Architectures

FIGS. 6-10 illustrate example computer architectures that can be used in accordance with embodiments disclosed herein. For example, in various embodiments, the computer architectures of FIGS. 6-10 may be used in conjunction with the point multiplication functionality described throughout this disclosure. Alternatively, in other embodiments, the computer architectures of FIGS. 6-10 may implement the point multiplication functionality described throughout this disclosure.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figures 6A, 6B:
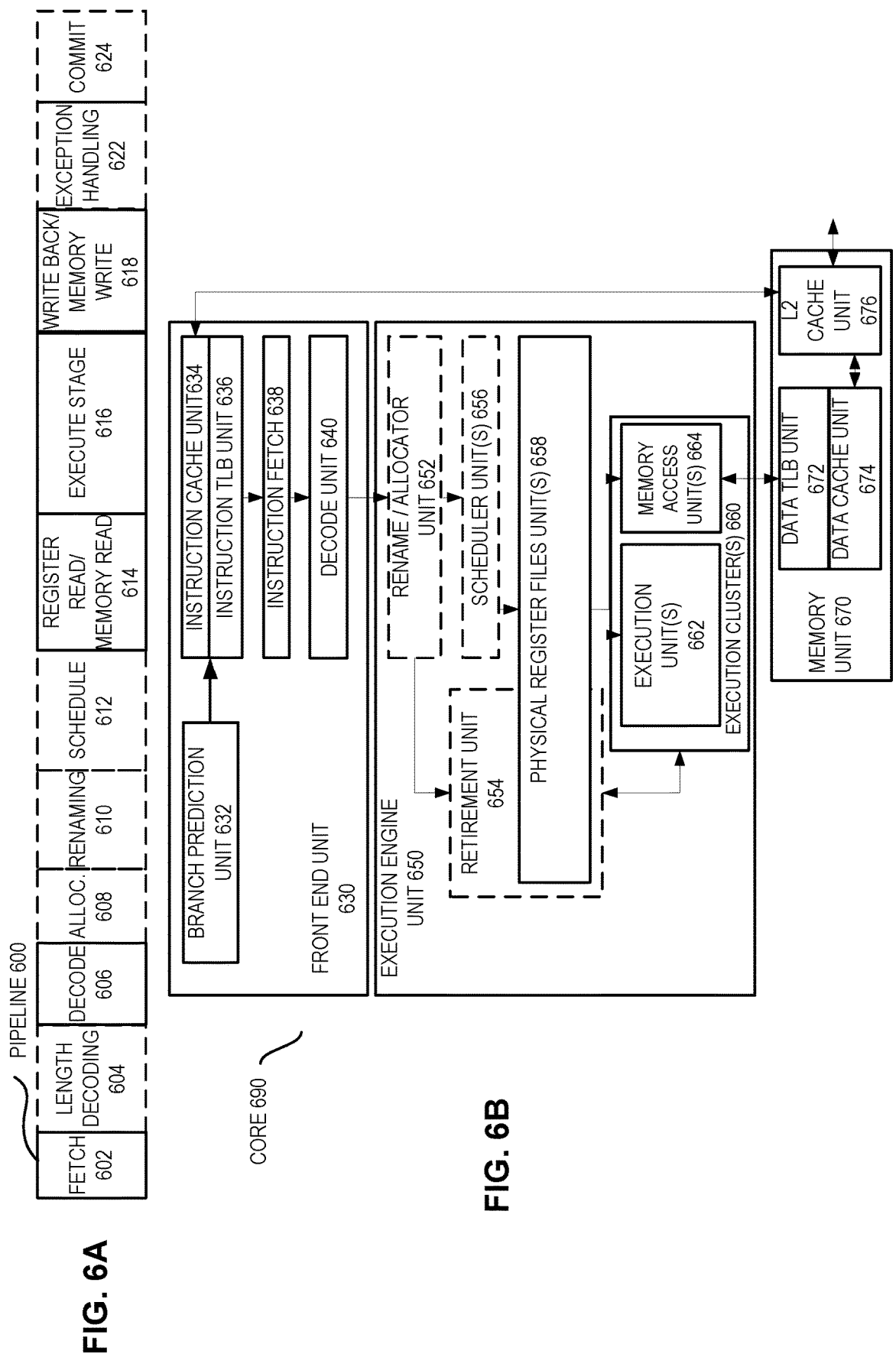
FIGS. 6A-B, 7, 8, 9, and 10 illustrate example computer architectures that can be used in accordance with embodiments disclosed herein.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 664. It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
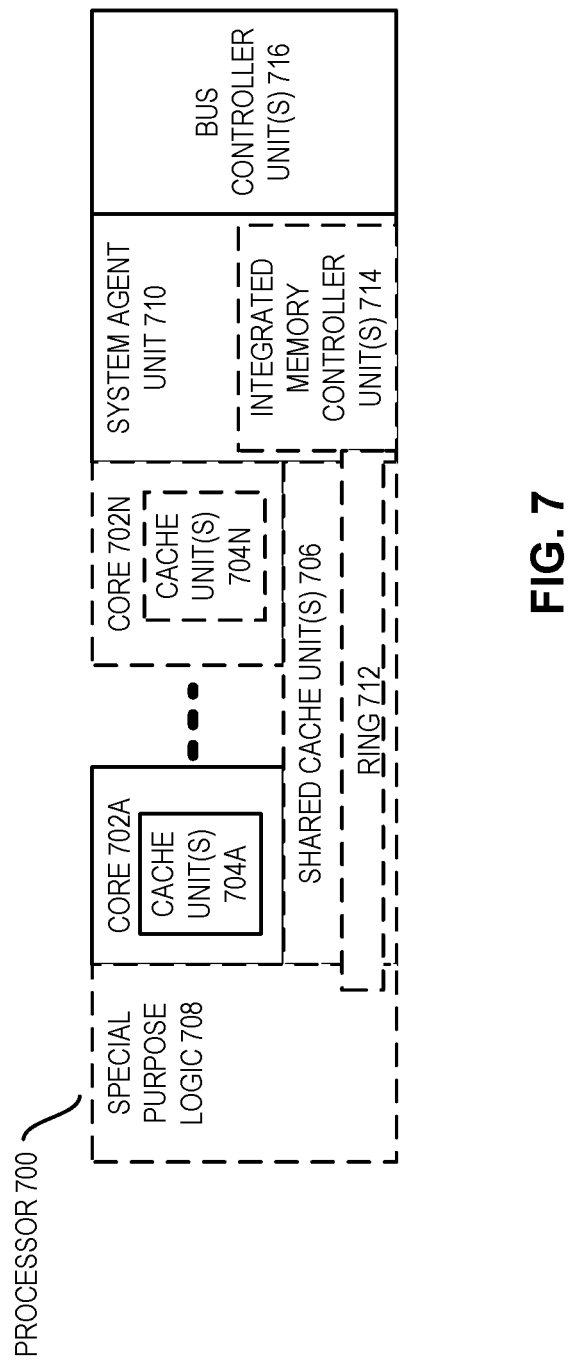

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Figure 8:
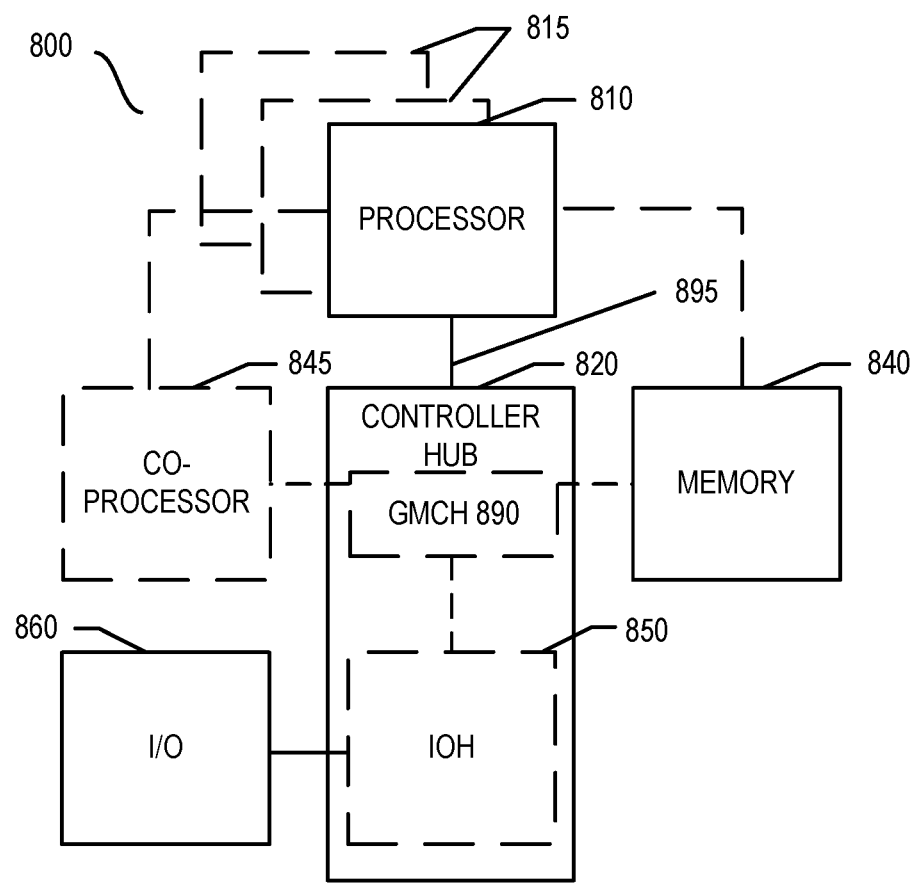

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
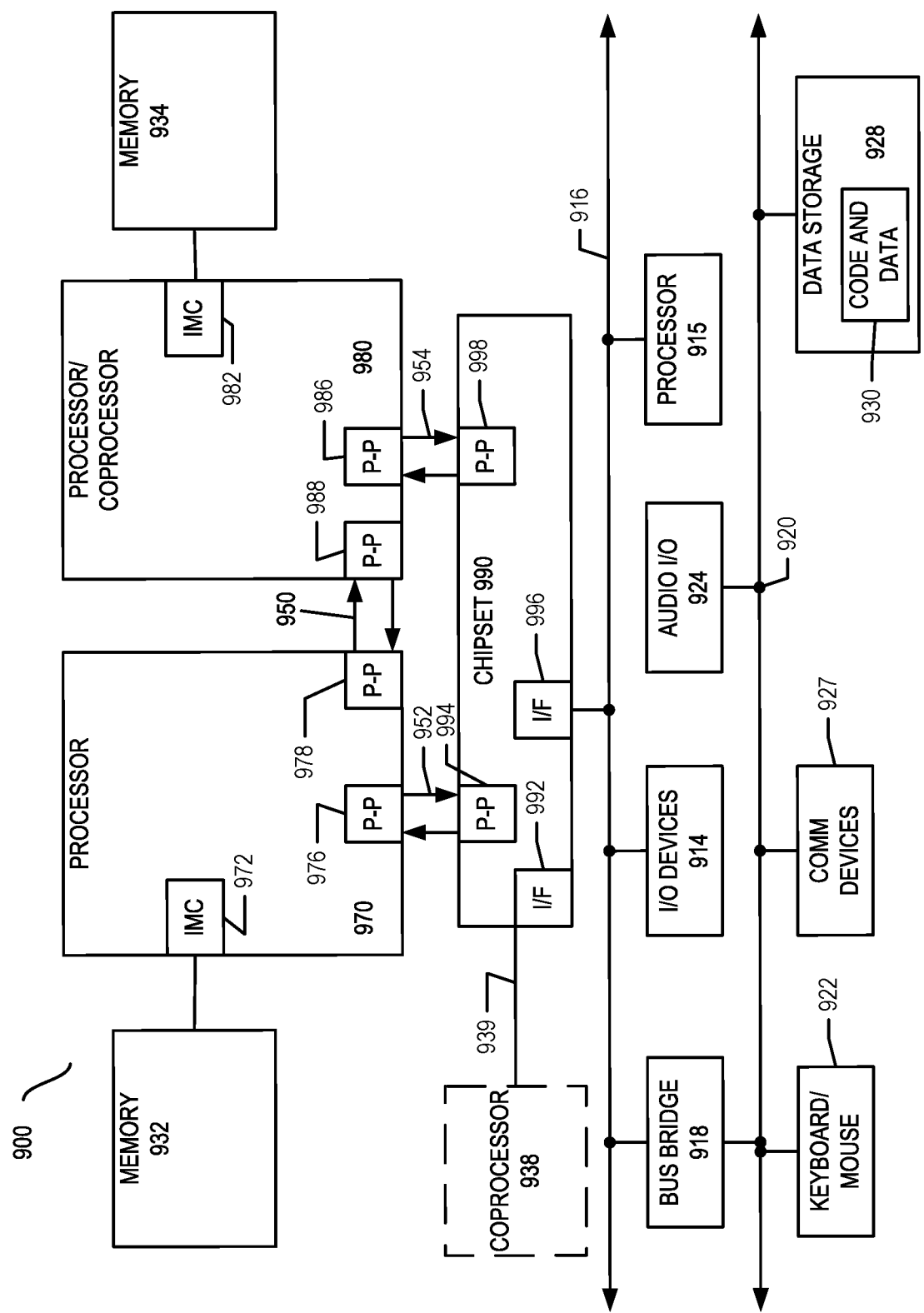

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
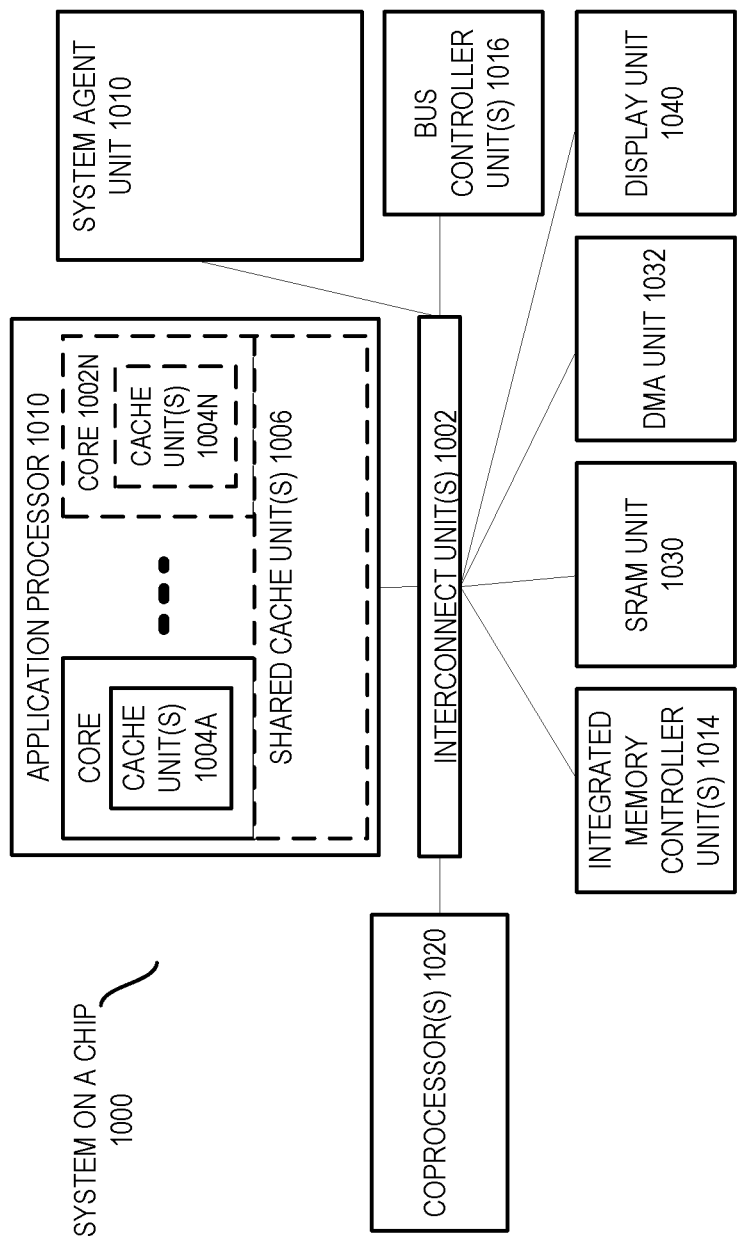

Referring now to FIG. 10, shown is a block diagram of a SoC 1000 in accordance with an embodiment of the present invention. Similar elements in FIG. 7 bear like reference numerals. Also, dashed lined boxes are optional features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a multiplier circuit to: identify a point multiply operation to be performed by the multiplier circuit, wherein the point multiply operation comprises point multiplication of a first plurality of operands; identify a point add operation associated with the point multiply operation, wherein the point add operation comprises point addition of a second plurality of operands, wherein the second plurality of operands comprises a first point and a second point, and wherein the first point and the second point are associated with a first coordinate system; convert the second point from the first coordinate system to a second coordinate system; perform the point add operation based on the first point associated with the first coordinate system and the second point associated with the second coordinate system; and perform the point multiply operation based on a result of the point add operation.

In one example embodiment of an apparatus, the first coordinate system comprises an Affine coordinate system, and wherein the second coordinate system comprises a Jacobian coordinate system.

In one example embodiment of an apparatus, the multiplier circuit is further to convert the result of the point add operation from the second coordinate system to the first coordinate system.

In one example embodiment of an apparatus, the multiplier circuit is further to determine whether the point add operation is to be performed using a single coordinate system or multiple coordinate systems.

In one example embodiment of an apparatus, the multiplier circuit is further to: generate a random number; and determine, based on the random number, that the point add operation is to be performed using multiple coordinate systems.

In one example embodiment of an apparatus, the point add operation does not comprise an inversion operation.

In one example embodiment of an apparatus, the point add operation further comprises a smaller number of operations than point addition in a single coordinate system.

In one example embodiment of an apparatus, the multiplier circuit is further to: identify a point double operation associated with the point multiply operation, wherein the point double operation comprises doubling a point operand, wherein the point operand is associated with the first coordinate system; convert the point operand from the first coordinate system to the second coordinate system; perform the point double operation based on the point operand associated with the second coordinate system; and perform the point multiply operation based on a result of the point double operation.

In one example embodiment of an apparatus, the multiplier circuit is further to convert the result of the point double operation from the second coordinate system to the first coordinate system.

In one example embodiment of an apparatus, the point double operation does not comprise an inversion operation.

In one example embodiment of an apparatus, the first plurality of operands comprises a first scalar operand and a second point operand, wherein the second point operand comprises a point on an elliptic curve.

In one example embodiment of an apparatus, the second plurality of operands further comprises a plurality of points on an elliptic curve.

In one example embodiment of an apparatus, the point multiply operation is associated with a cryptography operation.

One or more embodiments may include at least one machine accessible storage medium having instructions stored thereon, wherein the instructions, when executed on a machine, cause the machine to: identify a point multiply operation to be performed by a multiplier circuit, wherein the point multiply operation comprises point multiplication of a first plurality of operands; identify a point add operation associated with the point multiply operation, wherein the point add operation comprises point addition of a second plurality of operands, wherein the second plurality of operands comprises a first point and a second point, and wherein the first point and the second point are associated with a first coordinate system; convert the second point from the first coordinate system to a second coordinate system; perform the point add operation based on the first point associated with the first coordinate system and the second point associated with the second coordinate system; and perform the point multiply operation based on a result of the point add operation.

In one example embodiment of a storage medium, the first coordinate system comprises an Affine coordinate system, and wherein the second coordinate system comprises a Jacobian coordinate system.

In one example embodiment of a storage medium, the instructions further cause the machine to determine whether the point add operation is to be performed using a single coordinate system or multiple coordinate systems.

In one example embodiment of a storage medium, the instructions further cause the machine to: generate a random number; and determine, based on the random number, that the point add operation is to be performed using multiple coordinate systems.

In one example embodiment of a storage medium, the point add operation does not comprise an inversion operation.

In one example embodiment of a storage medium, the instructions further cause the machine to: identify a point double operation associated with the point multiply operation, wherein the point double operation comprises doubling a point operand, wherein the point operand is associated with the first coordinate system; convert the point operand from the first coordinate system to the second coordinate system; perform the point double operation based on the point operand associated with the second coordinate system; and perform the point multiply operation based on a result of the point double operation.

In one example embodiment of a storage medium: the first plurality of operands comprises a first scalar operand and a second point operand, wherein the second point operand comprises a point on an elliptic curve; and the second plurality of operands further comprises a plurality of points on the elliptic curve.

In one example embodiment of a storage medium, the point multiply operation is associated with a cryptography operation.

One or more embodiments may include a system, comprising: a memory to store information associated with an application; a processor to execute one or more instructions associated with the application; and a cryptography accelerator to perform a cryptography operation associated with the application, wherein the cryptography accelerator comprises a multiplier circuit to: identify a point multiply operation to be performed by the multiplier circuit, wherein the point multiply operation comprises point multiplication of a first plurality of operands; identify a point add operation associated with the point multiply operation, wherein the point add operation comprises point addition of a second plurality of operands, wherein the second plurality of operands comprises a first point and a second point, and wherein the first point and the second point are associated with a first coordinate system; convert the second point from the first coordinate system to a second coordinate system; perform the point add operation based on the first point associated with the first coordinate system and the second point associated with the second coordinate system; and perform the point multiply operation based on a result of the point add operation.

In one example embodiment of a system: the multiplier circuit comprises a random number generator to generate a random number; and the multiplier circuit is further to determine, based on the random number, whether the point add operation is to be performed using a single coordinate system or multiple coordinate systems.

One or more embodiments may include a method, comprising: identifying a point multiply operation to be performed by a multiplier circuit, wherein the point multiply operation comprises point multiplication of a first plurality of operands; identifying a point add operation associated with the point multiply operation, wherein the point add operation comprises point addition of a second plurality of operands, wherein the second plurality of operands comprises a first point and a second point, and wherein the first point and the second point are associated with a first coordinate system; converting the second point from the first coordinate system to a second coordinate system; performing the point add operation based on the first point associated with the first coordinate system and the second point associated with the second coordinate system; and performing the point multiply operation based on a result of the point add operation.

In one example embodiment of a method, the method further comprises: generating a random number; and determining, based on the random number, whether the point add operation is to be performed using a single coordinate system or multiple coordinate systems.

What is claimed is:

1. A point multiplier circuit to perform a point multiply operation, wherein the point multiplier circuit comprises:
control circuitry to identify a plurality of point arithmetic operations associated with the point multiply operation, wherein the plurality of point arithmetic operations comprises a plurality of point double operations and a plurality of point add operations;
randomization circuitry to randomly select a corresponding coordinate system for each of the plurality of point arithmetic operations, wherein the corresponding coordinate system for each of the plurality of point arithmetic operations is to comprise an Affine coordinate system, a Jacobian coordinate system, or a mixed Affine-Jacobian coordinate system;
point double circuitry to perform the plurality of point double operations, wherein each of the plurality of point double operations is to be performed in the corresponding coordinate system randomly selected by the randomization circuitry;
point add circuitry to perform the plurality of point add operations, wherein each of the plurality of point add operations is to be performed in the corresponding coordinate system randomly selected by the randomization circuitry; and
accumulator circuitry to accumulate a result of the point multiply operation, wherein the result is to be accumulated based on a plurality of partial results corresponding to the plurality of point arithmetic operations.

2. The point multiplier circuit of claim 1, wherein the randomization circuitry to randomly select the corresponding coordinate system for each of the plurality of point arithmetic operations is to:
randomly select the Affine coordinate system or the Jacobian coordinate system as the corresponding coordinate system for each of the plurality of point double operations; and
randomly select the Affine coordinate system or the mixed Affine-Jacobian coordinate system as the corresponding coordinate system for each of the plurality of point add operations.

3. The point multiplier circuit of claim 2, wherein for each of the plurality of point add operations to be performed in the mixed Affine-Jacobian coordinate system, the point add circuitry is to add a first point operand represented in the Affine coordinate system and a second point operand represented in the Jacobian coordinate system.

4. The point multiplier circuit of claim 1, wherein the randomization circuitry to randomly select the corresponding coordinate system for each of the plurality of point arithmetic operations is to:
generate a random number, wherein the random number is to comprise a plurality of bits corresponding to the plurality of point arithmetic operations;
identify, from the plurality of bits in the random number, a corresponding bit associated with each of the plurality of point arithmetic operations; and
select the corresponding coordinate system for each of the plurality of point arithmetic operations based on a value of the corresponding bit associated with each of the plurality of point arithmetic operations.

5. The point multiplier circuit of claim 1, wherein the point add circuitry to perform the plurality of point add operations is to:
randomly perform a first subset of the plurality of point add operations in the Affine coordinate system, wherein each point add operation in the first subset comprises an inversion operation; and
randomly perform a second subset of the plurality of point add operations in the mixed Affine-Jacobian coordinate system, wherein each point add operation in the second subset does not comprise an inversion operation.

6. The point multiplier circuit of claim 5, wherein each point add operation of the second subset performed in the mixed Affine-Jacobian coordinate system comprises a smaller number of arithmetic operations than each point add operation of the first subset performed in the Affine coordinate system.

7. The point multiplier circuit of claim 1, further comprising:
point conversion circuitry to convert a plurality of point operands for the plurality of point arithmetic operations between the Affine coordinate system and the Jacobian coordinate system.

8. The point multiplier circuit of claim 7, wherein the point conversion circuitry is further to convert the result of the point multiply operation from the Jacobian coordinate system to the Affine coordinate system.

9. The point multiplier circuit of claim 1, wherein the point double circuitry to perform the plurality of point double operations is to:
randomly perform a first subset of the plurality of point double operations in the Affine coordinate system, wherein each point double operation in the first subset comprises an inversion operation; and
randomly perform a second subset of the plurality of point double operations in the Jacobian coordinate system, wherein each point double operation in the second subset does not comprise an inversion operation.

10. The point multiplier circuit of claim 1, wherein the point multiply operation comprises multiplication of a point operand by a scalar operand.

11. The point multiplier circuit of claim 10, wherein the point operand comprises a point on an elliptic curve.

12. The point multiplier circuit of claim 11, wherein the point multiply operation is associated with a cryptography operation.

13. At least one machine accessible storage medium having instructions stored thereon, wherein the instructions, when executed on a machine, cause the machine to:
identify, using control circuitry of a point multiplier circuit, a point multiply operation to be performed by the point multiplier circuit, wherein the point multiply operation is to comprise a plurality of point arithmetic operations, and wherein the plurality of point arithmetic operations is to comprise a plurality of point double operations and a plurality of point add operations;
randomly select, using randomization circuitry of the point multiplier circuit, a corresponding coordinate system for each of the plurality of point arithmetic operations, wherein the corresponding coordinate system for each of the plurality of point arithmetic operations is to comprise an Affine coordinate system, a Jacobian coordinate system, or a mixed Affine-Jacobian coordinate system;

perform, using point double circuitry of the point multiplier circuit, the plurality of point double operations, wherein each of the plurality of point double operations is to be performed in the corresponding coordinate system randomly selected by the randomization circuitry;

perform, using point add circuitry of the point multiplier circuit, the plurality of point add operations, wherein each of the plurality of point add operations is to be performed in the corresponding coordinate system randomly selected by the randomization circuitry; and accumulate, using accumulator circuitry of the point multiplier circuit, a result of the point multiply operation, wherein the result is to be accumulated based on a plurality of partial results corresponding to the plurality of point arithmetic operations.

14. The storage medium of claim 13, wherein the instructions that cause the machine to randomly select, using the randomization circuitry of the point multiplier circuit, the corresponding coordinate system for each of the plurality of point arithmetic operations further cause the machine to:

randomly select the Affine coordinate system or the Jacobian coordinate system as the corresponding coordinate system for each of the plurality of point double operations; and randomly select the Affine coordinate system or the mixed Affine-Jacobian coordinate system as the corresponding coordinate system for each of the plurality of point add operations.

15. The storage medium of claim 13, wherein the instructions that cause the machine to randomly select, using the randomization circuitry of the point multiplier circuit, the corresponding coordinate system for each of the plurality of point arithmetic operations further cause the machine to:

generate a random number, wherein the random number is to comprise a plurality of bits corresponding to the plurality of point arithmetic operations;

identify, from the plurality of bits in the random number, a corresponding bit associated with each of the plurality of point arithmetic operations; and select the corresponding coordinate system for each of the plurality of point arithmetic operations based on a value of the corresponding bit associated with each of the plurality of point arithmetic operations.

16. The storage medium of claim 13, wherein the instructions that cause the machine to perform, using the point add circuitry of the point multiplier circuit, the plurality of point add operations further cause the machine to:

randomly perform a first subset of the plurality of point add operations in the Affine coordinate system, wherein each point add operation in the first subset comprises an inversion operation; and randomly perform a second subset of the plurality of point add operations in the mixed Affine-Jacobian coordinate system, wherein each point add operation in the second subset does not comprise an inversion operation.

17. The storage medium of claim 13, wherein the instructions further cause the machine to:

convert, using point conversion circuitry of the point multiplier circuit, a plurality of point operands for the plurality of point arithmetic operations between the Affine coordinate system and the Jacobian coordinate system.

18. The storage medium of claim 13, wherein the point multiply operation is to multiply a point operand by a scalar operand, wherein the point operand comprises a point on an elliptic curve.

19. The storage medium of claim 13, wherein the point multiply operation is associated with a cryptography operation.

20. A system, comprising:

a memory to store information associated with an application;

a processor to execute one or more instructions associated with the application; and a cryptography accelerator to perform a cryptography operation associated with the application, wherein the cryptography operation comprises a point multiply operation, and wherein the cryptography accelerator comprises:

control circuitry to identify a plurality of point arithmetic operations associated with the point multiply operation, wherein the plurality of point arithmetic operations comprises a plurality of point double operations and a plurality of point add operations;

randomization circuitry to randomly select a corresponding coordinate system for each of the plurality of point arithmetic operations, wherein the corresponding coordinate system for each of the plurality of point arithmetic operations is to comprise an Affine coordinate system, a Jacobian coordinate system, or a mixed Affine-Jacobian coordinate system;

point double circuitry to perform the plurality of point double operations, wherein each of the plurality of point double operations is to be performed in the corresponding coordinate system randomly selected by the randomization circuitry;

point add circuitry to perform the plurality of point add operations, wherein each of the plurality of point add operations is to be performed in the corresponding coordinate system randomly selected by the randomization circuitry; and accumulator circuitry to accumulate a result of the point multiply operation, wherein the result is to be accumulated based on a plurality of partial results corresponding to the plurality of point arithmetic operations.

21. The system of claim 20, wherein the randomization circuitry to randomly select the corresponding coordinate system for each of the plurality of point arithmetic operations is to:

generate a random number, wherein the random number is to comprise a plurality of bits corresponding to the plurality of point arithmetic operations;

identify, from the plurality of bits in the random number, a corresponding bit associated with each of the plurality of point arithmetic operations; and select the corresponding coordinate system for each of the plurality of point arithmetic operations based on a value of the corresponding bit associated with each of the plurality of point arithmetic operations.

22. A method, comprising:

identifying, using control circuitry of a point multiplier circuit, a point multiply operation to be performed by the point multiplier circuit, wherein the point multiply operation is to comprise a plurality of point arithmetic operations, and wherein the plurality of point arithmetic operations is to comprise a plurality of point double operations and a plurality of point add operations;

randomly selecting, using randomization circuitry of the point multiplier circuit, a corresponding coordinate system for each of the plurality of point arithmetic operations, wherein the corresponding coordinate system for each of the plurality of point arithmetic operations is to comprise an Affine coordinate system, a Jacobian coordinate system, or a mixed Affine-Jacobian coordinate system;

performing, using point double circuitry of the point multiplier circuit, the plurality of point double operations, wherein each of the plurality of point double operations is to be performed in the corresponding coordinate system randomly selected by the randomization circuitry;

performing, using point add circuitry of the point multiplier circuit, the plurality of point add operations, wherein each of the plurality of point add operations is to be performed in the corresponding coordinate system randomly selected by the randomization circuitry; and accumulating, using accumulator circuitry of the point multiplier circuit, a result of the point multiply operation, wherein the result is to be accumulated based on a plurality of partial results corresponding to the plurality of point arithmetic operations.

23. The method of claim 22, wherein randomly selecting, using the randomization circuitry of the point multiplier circuit, the corresponding coordinate system for each of the plurality of point arithmetic operations comprises:

generating a random number, wherein the random number is to comprise a plurality of bits corresponding to the plurality of point arithmetic operations;

identifying, from the plurality of bits in the random number, a corresponding bit associated with each of the plurality of point arithmetic operations; and selecting the corresponding coordinate system for each of the plurality of point arithmetic operations based on a value of the corresponding bit associated with each of the plurality of point arithmetic operations.

\* \* \* \* \*